United States Patent [19]

Van Doorne

[11] 3,721,043

[45] March 20, 1973

[54] PROCESS FOR THE IMPROVEMENT OF THE CONSTITUTION OF SOILS

[75] Inventor: Guy Camille Van Doorne, Zellik, Belgium

[73] Assignee: Labofina S.A.

[22] Filed: Oct. 27, 1971

[21] Appl. No.: 192,989

[52] U.S. Cl..................47/58, 47/DIG. 10, 61/36 R, 106/287 SS
[51] Int. Cl. ..............................................A01b 79/00
[58] Field of Search..................47/58, 1, DIG. 10, 9; 106/273 R, 287 SS; 61/36 R

[56] References Cited

UNITED STATES PATENTS

| | | | |
|---|---|---|---|
| 2,348,458 | 5/1944 | Endersby | 61/36 |
| 2,706,688 | 4/1955 | Sommer et al. | 47/DIG. 10 |
| 2,851,824 | 9/1958 | Addison | 47/58 |
| 3,036,015 | 5/1962 | Woodward | 47/9 UX |
| 3,061,974 | 11/1962 | Louis et al. | 47/9 |

*Primary Examiner*—Robert E. Bagwill
*Attorney*—M. N. Cheairs et al.

[57] ABSTRACT

A process for the improvement of the constitution of soils, which comprises incorporating into said soils an aqueous emulsion of bitumen containing a non-ionic surface-active compound and an anionic surface-active compound.

8 Claims, No Drawings

PROCESS FOR THE IMPROVEMENT OF THE CONSTITUTION OF SOILS

The present invention relates to a process for the improvement of the constitution of soils, namely of sandy soils, by using aqueous emulsions of bitumen.

Many countries have areas, even very vast, of sandy soils remaining sterile and arid because they do not absorb nor retain rain or irrigation water. This lack of moisture is an obstacle to the growth of plants and therefore these soils are easily eroded by wind and rain.

Bituminous emulsions, applied as continuous coatings or in strips, have already been proposed in order to retain moisture in the soil and to prevent or restrict soil movements. However, this proposed method which is performed with hydrophobic bituminous emulsions, does not modify the physical properties of the soil whose structure is not improved. In fact, this proposed method is only applicable to previously seeded soils whose nature is such that they easily retain moisture.

With sandy soils, it is necessary to modify completely the structure of the soil so that the sand particles form stable aggregates absorbing and retaining rain or irrigation water and allowing an easy access of air between their interstices. These conditions are essential to create favorable conditions for the growth of the microbial and vegetable flora. As a result of this modification of their structure, the sandy soils are thus stabilized and this result is particularly advantageous in engineering to increase the resistance to erosion of sides of canals, slopes along roads and railways, dunes, etc.

The main object of the present invention is to provide a means to improve the structure of sandy soils by agglomerating the hydrophobic sand particles into stable aggregates.

The present invention comprises the process of incorporating into the sandy soil a hydrophilic aqueous emulsion of bitumen containing a non-ionic surface-active compound and an anionic surface-active compound.

More particularly, the present process comprises incorporating in the soil an aqueous emulsion of bitumen consisting of a mixture of 45 to 70 percent by weight bitumen, 0.5 to 5 percent by weight, based on the bitumen, of a condensation product of an alkylene oxide with a higher fatty alcohol or with an alkyphenol, this condensation product containing from 2 to 15 groups of alkylene oxide, and 1 to 3 percent by weight, based on the bitumen, of an anionic surface active compound, the rest being water, said emulsion of bitumen having a pH of between about 9 and 12.

This emulsion may also include a stabilizing agent generally in an amount which does not generally exceed 1 percent by weight, based on the bitumen.

The aqueous emulsion is applied on the sandy soil which is then treated by any known means in order to incorporate said emulsion to a depth up to about 25 cm but more generally between 5 and 10 cm. The sand particles are in this manner agglomerated in stable aggregates which absorb and retain the water, while untreated sand particles practically do not retain moisture.

For effective formation of stable and hydrophilic aggregates, the bitumen containing emulsion must however fulfill certain critical conditions. This emulsion must wet the sand particles and stick to these particles which are thus agglomerated in stable aggregates. However, the emulsion must be hydrophilic, but this characteristic should not be too marked, otherwise the emulsion will be washed by the water. The emulsion also must be stable during storage, even at relatively low temperature, without requiring the use of a high concentration of bitumen which would give a very viscous and hardly sprayable emulsion. Furthermore, the emulsion must be a slow-breaking or eventually a semi-rapid breaking emulsion. These conditions are fulfilled only by a careful choice of the components of the hydrophilic emulsion and of their relative proportions in the mixture.

The hydrophilic character of the emulsion is obtained by the addition of condensation products of higher fatty alcohols or alkyphenols with alkylene oxides. These condensation products are used in an amount between 0.5 and 5 percent by weight based on the bitumen. Emulsions containing less than 0.5 percent of such condensation products are not sufficiently hydrophilic and the agglomerates of sandy soils resulting from such emulsions retain only 3 to 4 percent of water. Such amount is obviously too low to allow the development of seeds and the growth of plants. However, when the amount of condensation product is higher than 5 percent, the emulsion product is too hydrophilic. The condensation product is preferably used in an amount of between 1 and 2.5 percent by weight based on the weight of bitumen.

Any condensation product which is substantially water-soluble can be used according to the present invention. Such a condensation product is prepared by reacting several moles of alkylene oxide on an hydroxylic compound, such as a higher aliphatic alcohol or an alkylphenol. The higher aliphatic alcohol generally contains from 12 to 18 carbon atoms and the alkylphenol contains an alkyl radical which is generally an octyl or a nonyl radical. The more generally used alkylene oxides are ethylene oxide and propylene oxide. Of course, it is understood that condensation products may be prepared by reacting two different alkylene oxides with the same hydroxylic compound. The number of condensed alkylene oxide groups may be varied as a function of the type of hydroxylic compound and of the desired degree of water-solubility of the final product. Valuable condensation products generally contain from 2 to 15 alkylene oxide groups, more particularly from 6 to 15 alkylene oxide groups in the case of condensation products prepared from higher aliphatic alcohols, and from 2 to 9 alkylene oxide groups in the case of condensation products prepared from alkylphenols.

The anionic surface-active agent is of the sulfate or sulphonate type and is the emulsifying agent. It is used in an amount generally between 1 and 3 percent by weight based on the bitumen. Higher proportions of this emulsifying agent are not particularly useful because they are somewhat detrimental to the stability of the final emulsion. The anionic agent is chosen from the group consisting of the alkaline salts of sulphates of primary or secondary higher aliphatic alcohols, alkaline salts of sulphates of oxyalkylated alkylphenols, alkaline salts of sulphonates of paraffinic or olefinic hydrocarbons containing from 12 to 18 carbon atoms, and alkaline salts of sulphonates of alkylaromatic hydrocarbons. The choice of the anionic compound depends principally on economic conditions and, in this respect, alkaline salts of monoalkylbenzenesulphonic acids in which the alkyl group contains from 9 to 15 carbon atoms, as for example the alkaline salts of dodecylbenzenesulphonic acid, are preferably used.

The bitumen containing emulsion may also include an emulsion stabilizing agent which, if used, is added in an amount which generally does not exceed 1 percent by weight based on the bitumen. The amount depends primarily on the desired breaking speed of the emulsion and this speed depends on the amount of bitumen, the type and amount of oxyalkylated compound and of anionic compound, the pH of the emulsion, the nature of the treated soil and also on the type of stabilizing agent. Any known emulsion-stabilizing agent may be used, as for example the fatty amides, the saturated or unsaturated higher fatty alcohols, etc. The choice of this stabilizing agent also depends on economic conditions and, in this respect, alkaline lignosulphonates are particularly advantageous.

The pH of the emulsion is an important factor with regard to the breaking speed of the emulsion, this speed being preferably low. In this respect, the pH should be between 9.5 and 12, more particularly between 10 and 12. The pH is controlled by adding basic compounds, such as alkali, ammonia, etc., this latter compound having the advantage of providing a nutritive element to the vegetable flora.

Other fertilizing substances, phytohormones and the like also may be added to the emulsion if desired. Moreover, the aqueous emulsions of bitumen also may contain seeds. However, when including seeds, emulsions desirably should be somewhat thickened, for example by adding bentonite or similar product, so that the seeds remain in dispersion in the emulsion.

The aqueous emulsion of bitumen is prepared by heating the bitumen at a temperature between about 110° and 150° C and then by adding an aqueous phase containing the oxyalkylated condensate, the anionic wetting agent, the stabilizing agent, the basic compound and any other desired additives. The amount of bitumen generally is between 45 and 70 percent by weight of the amount of emulsion. The aqueous phase and bitumen are then emulsified by any known device, such as a colloidal mill.

The aqueous emulsion of bitumen is used in treating soil in an amount varying from 0.5 to 2.5 liters per square meter of treated soil, this amount depending on the nature and the moisture content of the soil. In order to make spraying of the emulsion and its incorporation into the soil easier, said emulsion may be diluted with water in an amount corresponding to 1 to 5 times, and more particularly from 1 to 2 times the volume of the emulsion.

These features and other characteristics of the present invention will be more apparent from the following examples which are merely illustrative and not limiting.

EXAMPLE 1

A bituminous emulsion is prepared from 50 parts by weight of bitumen having a penetration at 25° C of 180 to 250 tenths of mm. and from 50 parts by weight of an aqueous phase containing 1.5 percent by weight (calculated on the bitumen) of a condensation product prepared from 8 moles of ethylene oxide per mole of higher fatty $C_{12} - C_{14}$ alcohols, 2.5 percent by weight of a mixture containing a major part (about 95 percent) of sodium dodecylbenzenesulfonate with a minor amount of alkylbenzenesulfonates whose alkyl groups contain from nine to 15 carbon atoms, and 0.5 percent by weight of sodium lignosulfonate. Caustic potash was added to the emulsion to adjust the pH to 10.5.

This emulsion was stable and slow-breaking.

About 1.5 liter of this emulsion was sprayed upon a sandy soil per square meter of said sandy soil, the emulsion being diluted by twice its volume of water before spraying in order to hasten such spraying and the incorporation of the emulsion into the soil to an average depth of 10 cm.

Samples of the treated soil were taken off to a depth of 8 cm. in order to determine the agglomeration grade and the percentage of absorbed water. The agglomeration grade is the weight percentage of sand particles which are agglomerated into stable aggregates having sizes between 2 and 8 mm.

The mean results calculated on several determinations was the following:

| | |
|---|---|
| agglomeration grade: | 62% |
| absorbed water: | 18% |

The untreated soil absorbed only 2 percent of water and its agglomeration grade was practically 0.

By way of comparison, a similar experiment was carried out with a hydrophobic emulsion of bitumen. The agglomeration grade was about 55 percent, but the percentage of absorbed water remained lower than 3 percent. However, similar hydrophilic compositions were prepared, but with modifications of certain features with the following results:

a. with the use of a condensation product of ethylene oxide on fatty alcohol in an amount corresponding to 6 percent by weight calculated on the amount of bitumen, it was not possible to prepare a useful emulsion.
b. with the use of sodium dodecylbenzenesulphonate in an amount corresponding to 4.5 percent by weight calculated on the bitumen, the emulsion was not stable.
c. with the use of an emulsion having a pH of 6, the emulsion was a rapid-breaking one and the agglomeration grade was only 35 percent.
d. with the use of an emulsion prepared without non-ionic condensation product, the agglomeration grade was lower than 35 percent.

EXAMPLE 2

An emulsion was prepared as described in Example 1, but with the use of 2 percent by weight (calculated on the amount of bitumen) of a condensation product prepared from 4 moles of ethylene oxide per mole of nonylphenol, 2 percent by weight of the sodium sulphates obtained from fatty $C_{12} - C_{16}$ alcohols, and 0.3 percent by weight of stearylamide.

The bituminous emulsion was sprayed on dry sandy soil in an amount corresponding to about 2.5 liters per square meter of said dry sandy soil, the emulsion being diluted by twice its volume of water.

The agglomeration grade was 60 percent and the percentage of absorbed water was about 21 percent.

EXAMPLES 3 TO 5

Bituminous emulsions were prepared and used as described in Example 1, but by substituting for the dodecylbenzenesulphonate respectively the following materials:

Example 3: a mixture of sodium sulphates of secondary $C_{10} - C_{18}$ alcohols Example 4: the sodium salt of sulphuric acid derivative of the product obtained by condensing three to four moles of ethylene oxide on nonylphenol Example 5: the potassium salt of the sulphonic acid prepared from product paraffinic fraction containing 12–18 carbon atoms.

Upon spraying upon a sandy soil as described in Example 1, the results were as follows:

|           | Agglomeration grade | Absorbed water |
|-----------|---------------------|----------------|
| Example 3 | 57%                 | 18%            |
| Example 4 | 58%                 | 19%            |
| Example 5 | 52%                 | 18%            |

EXAMPLE 6

The operation of Example 1 was repeated, but with an aqueous emulsion of bitumen prepared by using, instead of sodium dodecylbenzenesulphonate and lignosulphonate, 2 percent by weight of a fraction of fatty $C_{12} - C_{16}$ alcohols which were not completely sulphated, the unsulphated alcohols (about 20 percent) acting as stabilizing agent for the emulsion.

The agglomeration grade was 60 percent and the percentage of absorbed water was 19 percent.

What is claimed is:

1. A process for the improvement of the constitution of soils, which comprises incorporating into said soils an aqueous emulsion of bitumen containing a non-ionic surface-active compound and an anionic surface-active compound, said aqueous emulsion of bitumen being one consisting of 45 to 70 percent by weight of bitumen, 0.5 to 5 percent by weight, calculated on the bitumen, of a condensation product of alkylene oxide on a higher fatty alcohol or an alkylphenol, said condensation product containing from 2 to 15 alkylene oxide groups, and 1 to 3 percent by weight, calculated on the bitumen, of an anionic surface-active agent of the sulphate of sulphonate type, the remainder of the emulsion being water, the emulsion having a pH from 9 to 12.

2. The process of claim 1 wherein said emulsion of bitumen includes a stabilizing agent in an amount no greater than 1% of the weight of bitumen.

3. The process of claim 2 wherein said stabilizing agent is an alkaline lignosulphonate.

4. The process of claim 1 wherein the said emulsion of bitumen is sprayed on the soil and is incorporated therein to a depth of 5 to 10 cm.

5. The process of claim 1 wherein the emulsion of bitumen contains from 1 to 2.5 percent by weight, calculated on the bitumen, of a condensation product prepared from alkylene oxide and a hydroxylic compound consisting of higher fatty alcohols containing 12 to 18 carbon atoms and of alkylphenol where the alkyl group contains eight or nine carbon atoms.

6. The process of claim 1 wherein the said anionic surface active compound is present in an amount of 1 to 3 percent by weight, calculated on the bitumen, and the anionic surface active compound is one selected from the group consisting of alkaline salts of the sulphonic acids obtained from higher fatty primary or secondary alcohols, alkaline salts of sulphuric acids prepared from oxyalkylated alkylphenols, alkaline salts of sulphonic acids prepared from paraffinic or olefinic hydrocarbons containing from 12 to 18 carbon atoms or from alkylaromatic hydrocarbons.

7. The process of claim 1 wherein said emulsion of bitumen contains 1 to 3 percent by weight, calculated on the bitumen, of an alkaline salt of dodecylbenzenesulphonic acid.

8. The process of claim 1 wherein said emulsion of bitumen is used in an amount varying from 0.5 to 2.5 liters per square meter of soil.

* * * * *

UNITED STATES PATENT OFFICE
CERTIFICATE OF CORRECTION

Patent No. 3,721,043      Dated March 20, 1973

Inventor(s) Guy Camille Van Doorne

It is certified that error appears in the above-identified patent and that said Letters Patent are hereby corrected as shown below:

Item [30] on title page insert,

Italy      19442-A/71      January 16, 1971

Signed and Sealed this thirteenth Day of January 1976

[SEAL]

Attest:

RUTH C. MASON
*Attesting Officer*

C. MARSHALL DANN
*Commissioner of Patents and Trademarks*